(12) United States Patent
Kumar et al.

(10) Patent No.: US 10,368,148 B2
(45) Date of Patent: Jul. 30, 2019

(54) CONFIGURABLE COMPUTING RESOURCE PHYSICAL LOCATION DETERMINATION

(71) Applicant: INTEL CORPORATION, Santa Clara, CA (US)

(72) Inventors: Mohan J. Kumar, Aloha, OR (US); Murugasamy K. Nachimuthu, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 15/396,338

(22) Filed: Dec. 30, 2016

(65) Prior Publication Data
US 2018/0027376 A1    Jan. 25, 2018

Related U.S. Application Data

(60) Provisional application No. 62/427,268, filed on Nov. 29, 2016, provisional application No. 62/376,859, (Continued)

(51) Int. Cl.
*H04W 4/02* (2018.01)
*H04Q 11/00* (2006.01)
(Continued)

(52) U.S. Cl.
CPC ...... *H04Q 11/0005* (2013.01); *B25J 15/0014* (2013.01); *B65G 1/0492* (2013.01); *G02B 6/3882* (2013.01); *G02B 6/3893* (2013.01); *G02B 6/3897* (2013.01); *G02B 6/4292* (2013.01); *G02B 6/4452* (2013.01); *G05D 23/1921* (2013.01); *G05D 23/2039* (2013.01); *G06F 1/183* (2013.01); *G06F 3/061* (2013.01);
(Continued)

(58) Field of Classification Search
CPC ....... H04W 4/023; H04W 4/80; H04W 4/008; H04L 49/45; H04L 49/555; H04L 67/10; H04Q 11/0062; H04Q 2011/0052; H04Q 2011/0079; H04Q 2011/0086
See application file for complete search history.

(56) References Cited

U.S. PATENT DOCUMENTS 7,302,593 B2 * 11/2007 Rothman .................. G01S 5/14
  713/300
7,857,214 B2 * 12/2010 Saliaris ................... G06F 1/181
  235/383

(Continued)

OTHER PUBLICATIONS

International Search Report received for PCT Patent Application No. PCT/US2017/038665, dated Oct. 18, 2017, 3 pages.

*Primary Examiner* — Sisay Yacob
(74) *Attorney, Agent, or Firm* — Barnes & Thornburg LLP

(57) ABSTRACT

Examples may include techniques to determine locations of a physical resource in a data center. A data center can include a number of racks having sled spaced. The sled spaces accommodate sleds having one or more physical resources disposed on each sled. The racks and sleds can include a beacon and beacon sensor, respectively, operable to determine a location of the sleds within the data center. Beacons and beacon sensors can exchange signals, a pod controller can receive an information element including indications of the exchanged signals and determine a location of the physical resource within the data center.

19 Claims, 14 Drawing Sheets

Related U.S. Application Data filed on Aug. 18, 2016, provisional application No. 62/365,969, filed on Jul. 22, 2016.

(51) Int. Cl.

| | |
|---|---|
| H04L 29/08 | (2006.01) |
| H04L 12/939 | (2013.01) |
| H04L 12/931 | (2013.01) |
| H03M 7/40 | (2006.01) |
| H03M 7/30 | (2006.01) |
| G06F 16/901 | (2019.01) |
| G06F 3/06 | (2006.01) |
| G11C 7/10 | (2006.01) |
| H05K 7/14 | (2006.01) |
| G06F 1/18 | (2006.01) |
| G06F 13/40 | (2006.01) |
| H05K 5/02 | (2006.01) |
| G08C 17/02 | (2006.01) |
| H04L 12/24 | (2006.01) |
| H04L 12/26 | (2006.01) |
| H04L 12/851 | (2013.01) |
| G06F 9/50 | (2006.01) |
| H04L 12/911 | (2013.01) |
| G06F 12/109 | (2016.01) |
| H04L 29/06 | (2006.01) |
| G11C 14/00 | (2006.01) |
| G11C 5/02 | (2006.01) |
| G11C 11/56 | (2006.01) |
| G02B 6/44 | (2006.01) |
| G06F 8/65 | (2018.01) |
| G06F 12/14 | (2006.01) |
| G06F 13/16 | (2006.01) |
| H04B 10/25 | (2013.01) |
| G06F 9/4401 | (2018.01) |
| G02B 6/38 | (2006.01) |
| G02B 6/42 | (2006.01) |
| B25J 15/00 | (2006.01) |
| B65G 1/04 | (2006.01) |
| H05K 7/20 | (2006.01) |
| H04L 12/751 | (2013.01) |
| G06F 13/42 | (2006.01) |
| H05K 1/18 | (2006.01) |
| G05D 23/19 | (2006.01) |
| G05D 23/20 | (2006.01) |
| H04L 12/927 | (2013.01) |
| H05K 1/02 | (2006.01) |
| H04L 12/781 | (2013.01) |
| H04Q 1/04 | (2006.01) |
| G06F 12/0893 | (2016.01) |
| H05K 13/04 | (2006.01) |
| G11C 5/06 | (2006.01) |
| G06F 11/14 | (2006.01) |
| G06F 11/34 | (2006.01) |
| G06F 12/0862 | (2016.01) |
| G06F 15/80 | (2006.01) |
| H04L 12/919 | (2013.01) |
| G06F 12/10 | (2016.01) |
| G06Q 10/06 | (2012.01) |
| G07C 5/00 | (2006.01) |
| H04L 12/28 | (2006.01) |
| H04L 29/12 | (2006.01) |
| H04L 9/06 | (2006.01) |
| H04L 9/14 | (2006.01) |
| H04L 9/32 | (2006.01) |
| H04L 12/933 | (2013.01) |
| H04L 12/947 | (2013.01) |
| H04L 12/811 | (2013.01) |
| H04W 4/80 | (2018.01) |
| G06Q 10/08 | (2012.01) |
| G06Q 10/00 | (2012.01) |
| G06Q 50/04 | (2012.01) |

(52) U.S. Cl.

CPC .............. *G06F 3/064* (2013.01); *G06F 3/067* (2013.01); *G06F 3/0611* (2013.01); *G06F 3/0613* (2013.01); *G06F 3/0616* (2013.01); *G06F 3/0619* (2013.01); *G06F 3/0625* (2013.01); *G06F 3/0631* (2013.01); *G06F 3/0638* (2013.01); *G06F 3/0647* (2013.01); *G06F 3/0653* (2013.01); *G06F 3/0655* (2013.01); *G06F 3/0658* (2013.01); *G06F 3/0659* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 16/9014* (2019.01); *G06Q 10/06* (2013.01); *G06Q 10/06314* (2013.01); *G07C 5/008* (2013.01); *G08C 17/02* (2013.01); *G11C 5/02* (2013.01); *G11C 5/06* (2013.01); *G11C 7/1072* (2013.01); *G11C 11/56* (2013.01); *G11C 14/0009* (2013.01); *H03M 7/30* (2013.01); *H03M 7/3084* (2013.01); *H03M 7/3086* (2013.01); *H03M 7/40* (2013.01); *H03M 7/4031* (2013.01); *H03M 7/4056* (2013.01); *H03M 7/4081* (2013.01); *H03M 7/6005* (2013.01); *H03M 7/6023* (2013.01); *H04B 10/2504* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/145* (2013.01); *H04L 41/147* (2013.01); *H04L 43/08* (2013.01); *H04L 43/0817* (2013.01); *H04L 43/0876* (2013.01); *H04L 43/0894* (2013.01); *H04L 43/16* (2013.01); *H04L 45/02* (2013.01); *H04L 45/52* (2013.01); *H04L 47/24* (2013.01); *H04L 47/38* (2013.01); *H04L 47/765* (2013.01); *H04L 47/782* (2013.01); *H04L 47/805* (2013.01); *H04L 47/82* (2013.01); *H04L 47/823* (2013.01); *H04L 49/15* (2013.01); *H04L 49/25* (2013.01); *H04L 49/357* (2013.01); *H04L 49/45* (2013.01); *H04L 49/555* (2013.01); *H04L 67/02* (2013.01); *H04L 67/10* (2013.01); *H04L*

67/1004 (2013.01); *H04L 67/1008* (2013.01); *H04L 67/1012* (2013.01); *H04L 67/1014* (2013.01); *H04L 67/1029* (2013.01); *H04L 67/1034* (2013.01); *H04L 67/1097* (2013.01); *H04L 67/12* (2013.01); *H04L 67/16* (2013.01); *H04L 67/306* (2013.01); *H04L 67/34* (2013.01); *H04L 69/04* (2013.01); *H04L 69/329* (2013.01); *H04Q 1/04* (2013.01); *H04Q 11/00* (2013.01); *H04Q 11/0003* (2013.01); *H04Q 11/0062* (2013.01); *H04Q 11/0071* (2013.01); *H04W 4/023* (2013.01); *H05K 1/0203* (2013.01); *H05K 1/181* (2013.01); *H05K 5/0204* (2013.01); *H05K 7/1418* (2013.01); *H05K 7/1421* (2013.01); *H05K 7/1442* (2013.01); *H05K 7/1447* (2013.01); *H05K 7/1461* (2013.01); *H05K 7/1487* (2013.01); *H05K 7/1489* (2013.01); *H05K 7/1491* (2013.01); *H05K 7/1492* (2013.01); *H05K 7/1498* (2013.01); *H05K 7/2039* (2013.01); *H05K 7/20709* (2013.01); *H05K 7/20727* (2013.01); *H05K 7/20736* (2013.01); *H05K 7/20745* (2013.01); *H05K 7/20836* (2013.01); *H05K 13/0486* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/087* (2013.01); *G06Q 10/20* (2013.01); *G06Q 50/04* (2013.01); *G08C 2200/00* (2013.01); *H04B 10/25* (2013.01); *H04L 41/12* (2013.01); *H04L 41/5019* (2013.01); *H04L 43/065* (2013.01); *H04Q 2011/0037* (2013.01); *H04Q 2011/0041* (2013.01); *H04Q 2011/0052* (2013.01); *H04Q 2011/0073* (2013.01); *H04Q 2011/0079* (2013.01); *H04Q 2011/0086* (2013.01); *H04Q 2213/13523* (2013.01); *H04Q 2213/13527* (2013.01); *H04W 4/80* (2018.02); *H05K 7/1485* (2013.01); *H05K 2201/066* (2013.01); *H05K 2201/10121* (2013.01); *H05K 2201/10159* (2013.01); *H05K 2201/10189* (2013.01); *Y02D 10/14* (2018.01); *Y02D 10/151* (2018.01); *Y02P 90/30* (2015.11); *Y10S 901/01* (2013.01)

(56) References Cited

U.S. PATENT DOCUMENTS

| | | | | |
|---|---|---|---|---|
| 8,094,020 | B2 * | 1/2012 | Groth | G06Q 10/087 340/568.2 |
| 2003/0046339 | A1 * | 3/2003 | Ip | H04L 41/12 709/203 |
| 2005/0138439 | A1 * | 6/2005 | Rothman | G01S 5/14 713/300 |
| 2007/0176782 | A1 * | 8/2007 | Mohalik | G08B 13/1427 340/572.1 |
| 2010/0289620 | A1 * | 11/2010 | Aminger | G06K 7/10405 340/10.1 |
| 2012/0116590 | A1 * | 5/2012 | Florez-Larrahondo | G06F 1/206 700/275 |
| 2012/0185590 | A1 | 7/2012 | Kolin et al. | |
| 2014/0253093 | A1 | 9/2014 | Bermudez Rodriguez et al. | |
| 2017/0213057 | A1 * | 7/2017 | Primm | H05K 7/1498 |
| 2017/0214117 | A1 * | 7/2017 | Gracyk | G06K 7/10366 |

* cited by examiner

US 10,368,148 B2

CONFIGURABLE COMPUTING RESOURCE PHYSICAL LOCATION DETERMINATION

RELATED CASE

This application claims priority to U.S. Provisional Patent Application entitled "Framework and Techniques for Pools of Configurable Computing Resources" filed on Nov. 29, 2016 and assigned Ser. No. 62/427,268; U.S. Provisional Patent Application entitled "Scalable System Framework Prime (SSFP) Omnibus Provisional II" filed on Aug. 18, 2016 and assigned Ser. No. 62/376,859; and U.S. Provisional Patent Application entitled "Framework and Techniques for Pools of Configurable Computing Resources" filed on Jul. 22, 2016 and assigned Ser. No. 62/365,969, each of which is hereby incorporated by reference in their entirety.

TECHNICAL FIELD

Embodiments described herein generally relate to data centers and particularly to physical resource location determination within a data center.

BACKGROUND

Advancements in networking have enabled the rise in pools of configurable computing resources. A pool of configurable computing resources may be formed from a physical infrastructure including disaggregate physical resources for example, as found in large data centers. The physical infrastructure can include a number of resources having processors, memory, storage, networking, power, cooling, etc. Management entities of these data centers can aggregate a selection of the resources to form servers and/or computing hosts. These hosts can subsequently be allocated to execute system SW (e.g., OSs, VMMs, or the like), host containers, VMs, and/or applications. However, as the number of resources in the pool grows, it can be difficult to determine a physical location (e.g., in the data center, or the like) of resources in the pool.

DETAILED DESCRIPTION

Data centers may be generally composed of a large number of racks that may contain numerous types of hardware or configurable resources (e.g., storage, central processing units (CPUs), memory, networking, fans/cooling modules, power units, etc.). The types of hardware or configurable resources deployed in data centers may also be referred to as disaggregate physical elements. It is to be appreciated, that the size and number of resources within a data center can be large, for example, on the order of hundreds of thousands of disaggregate physical elements. These disaggregate physical elements are often disposed in large warehouses and can be spread across multiple floors of a warehouse or even spread across multiple warehouses. Maintenance of the disaggregate physical elements can require physical inspection, service, removal, replacement or the like. However, due to the number of the disaggregate physical elements, determining the actual physical location of a particular disaggregate physical element within a data center can be challenging. It is with respect to these and/or other challenges that the examples described herein are needed.

Figure 1:
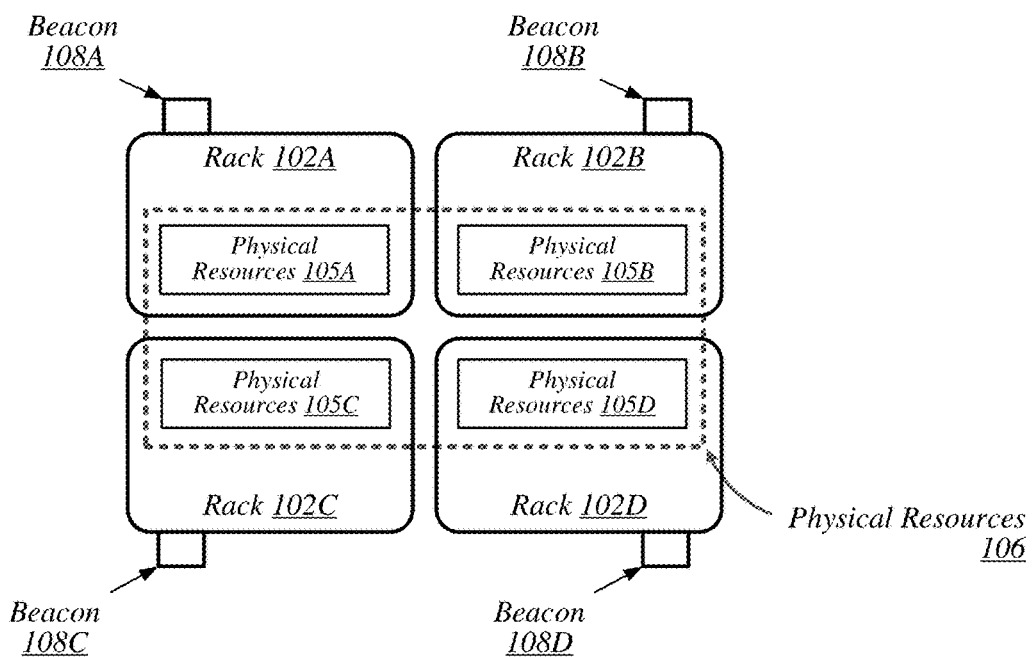
FIG. 1 illustrates a first example data center.

FIG. 1 illustrates a conceptual overview of a data center 100 that may generally be representative of a data center or other type of computing network in/for which one or more techniques described herein may be implemented according to various embodiments. As shown in this figure, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), graphics processing units (GPUs), memory, interconnect components, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A to 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in some embodiments, the racks 102A to 102D include integrated power sources that receive a higher current than is typical for power sources. The increased current enables the power sources to provide additional power to the components on each sled, enabling the components to operate at higher than typical frequencies.

Data center 100 can also include beacons disposed throughout the data center to facilitate locating various ones of the physical resources 105A to 105D. For example, as depicted in this figure, beacons 108A to 108D are depicted coupled to racks 102A to 102D, respectively. The data center 100 further includes beacon sensors (refer to FIG. 7, FIG. 10 and FIG. 12) which can be associated with physical resources 105A to 105D and used to determine a location of the physical resources 105A to 105D within the data center 100.

It is noted, that the beacons and corresponding beacon sensors can be any suitable beacon and corresponding sensor to emit and to receive signals including indications of locations and/or other information. In particular, the beacon and beacon sensors depicted herein can be any configured to emit and detect any signal usable to determine a location of physical resources 105A to 105D within data center 100. For example, the beacons and sensors can be radio frequency identification (RFID) beacons and sensors, near field communication (NFC) beacons and sensors, magnetic beacons and sensors, or the like). Furthermore, it is important to note, that the beacons 108A to 108D are depicted coupled to racks 102A to 102D while beacon sensors are depicted coupled to sleds (e.g., refer to FIG. 2, FIG. 7, FIG. 10 and FIG. 12) and associated with physical resources 105A to 105D. However, this is done for purposes of convenience and clarity only. Examples are not limited in this context and a data center, such as, data center 100, can be implemented with beacons coupled to sleds and beacon sensors coupled to racks.

Figure 11:
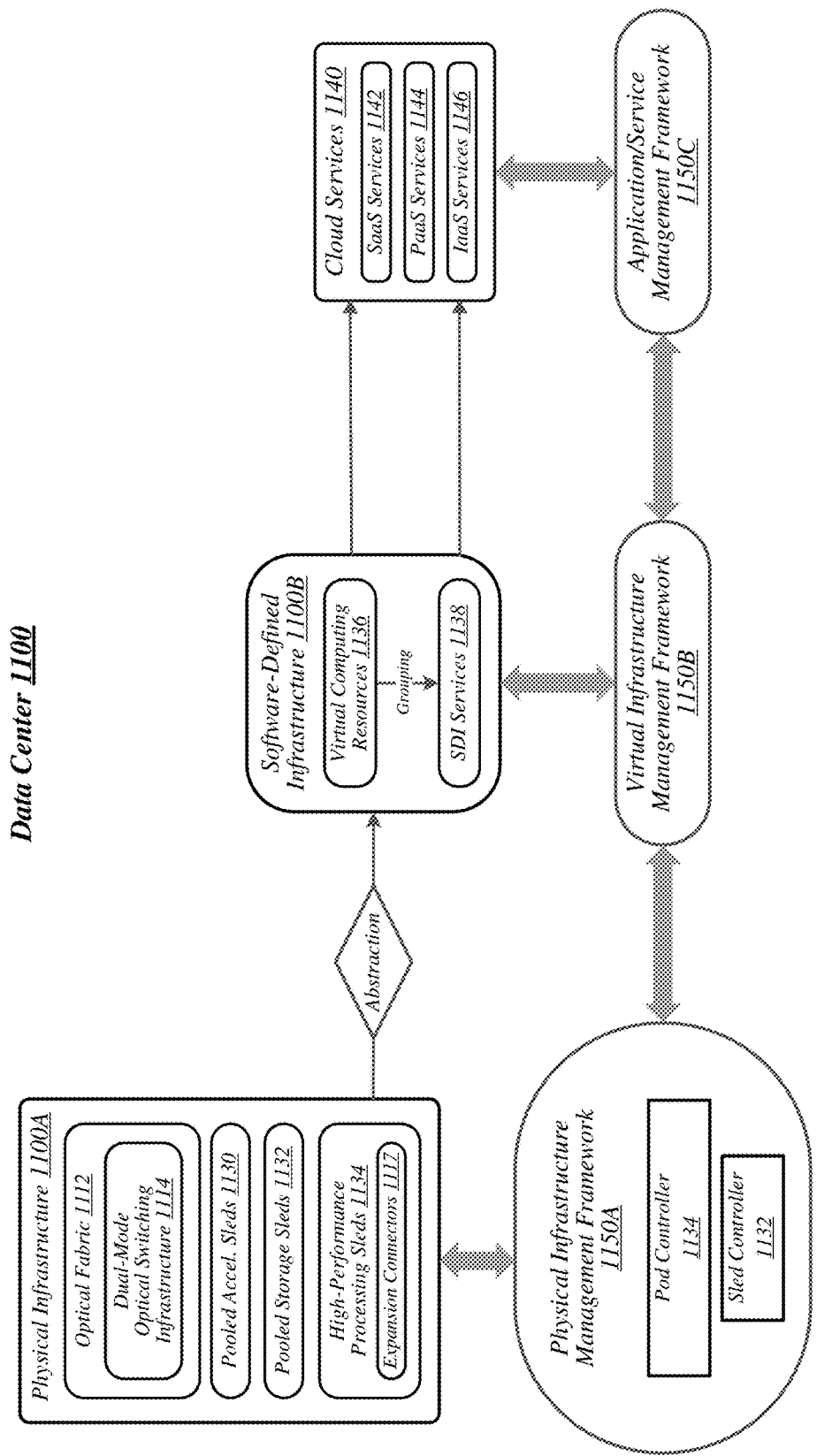
FIG. 11 illustrates a third example data center.
Figure 12:
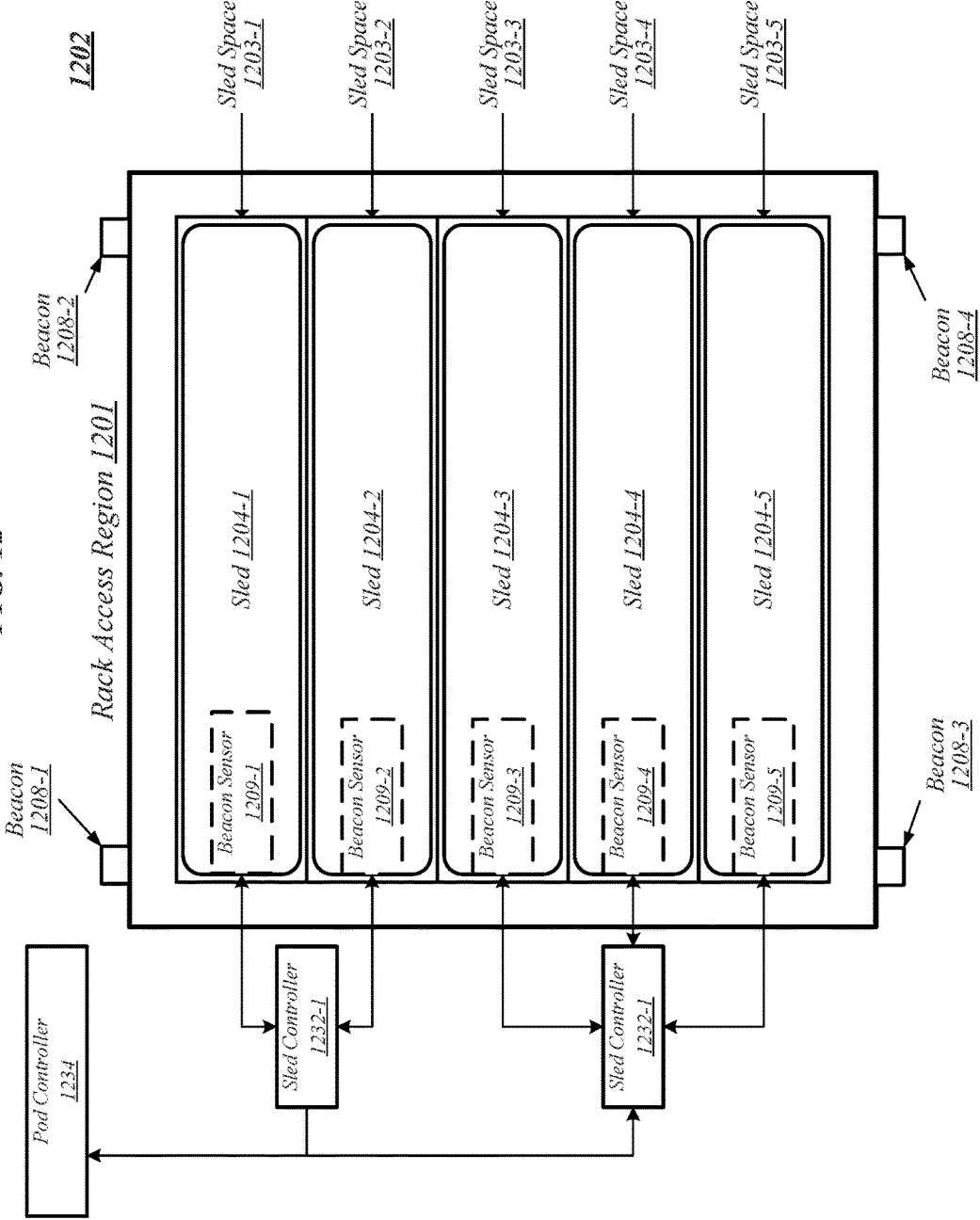
FIG. 12 illustrates a portion of a fourth example data center.

During operation, beacon sensors and beacons 108A to 108D can exchange signals and communicate control signals and/or information elements including indications of the received signals to sled management controllers (refer to FIG. 11 and FIG. 12). Sled management controllers can determine a physical location of individual physical resources 105A to 105D based on the received signals. Additionally, beacons 108A to 108D and/or beacon sensors can send information elements to management entities (e.g., an orchestration layer, or the like) for the data center 100, the information elements can include indications of operating conditions of physical resources 105A to 105D. For example, the information elements can include indications (e.g., data, metrics, statistics, logs, beacon location, etc.) related failures, errors, runtime conditions, and/or location within the data center 100 of the physical resources 105A to 105D. This is explained in greater detail below.

Figure 2:
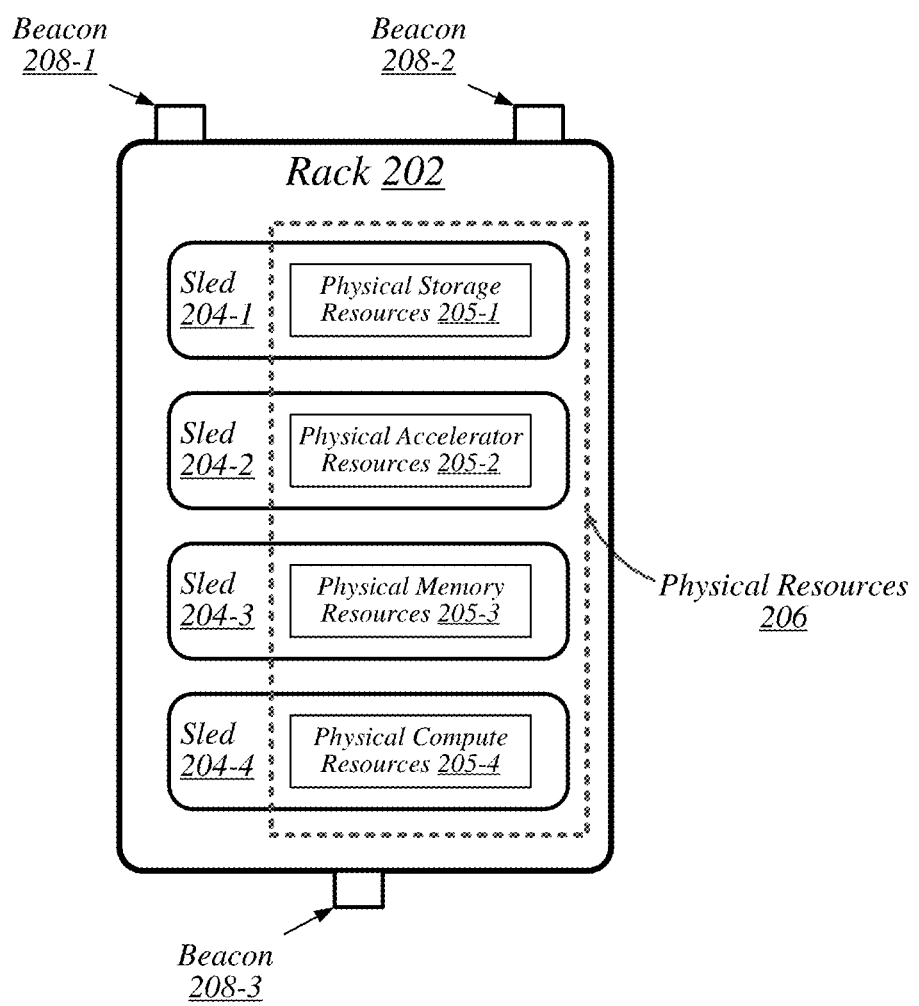
FIG. 2 illustrates a first example rack of a data center.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in this figure, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources 205-1 to 205-4 comprised in the sleds 204-1 to 204-4 of rack 202. As depicted in this illustrative embodiment, physical resources 205-1 to 205-4 include physical storage resources 205-1, physical accelerator resources 205-2, physical memory resources 205-3, and physical compute resources 205-5. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Furthermore, it is noted, the number of sleds 204-1 to 204-4 and the arrangement (e.g., column, row, etc.) is depicted at a quantity and in an arrangement to facilitate understanding. However, examples are not limited in these contexts.

Rack 202 can include beacons 208-1 to 208-3 disposed in various locations on, within, or adjacent to rack 202. The number of beacons 208-1 to 208-3 and their placement respective to rack 202 can include a number and arrangement to provide determination of a physical location of individual physical resources 205-1 to 205-4 based on signals exchanged between beacons 208-1 to 208-3 and beacons sensors disposed in sleds 204-1 to 204-4.

Figure 3:
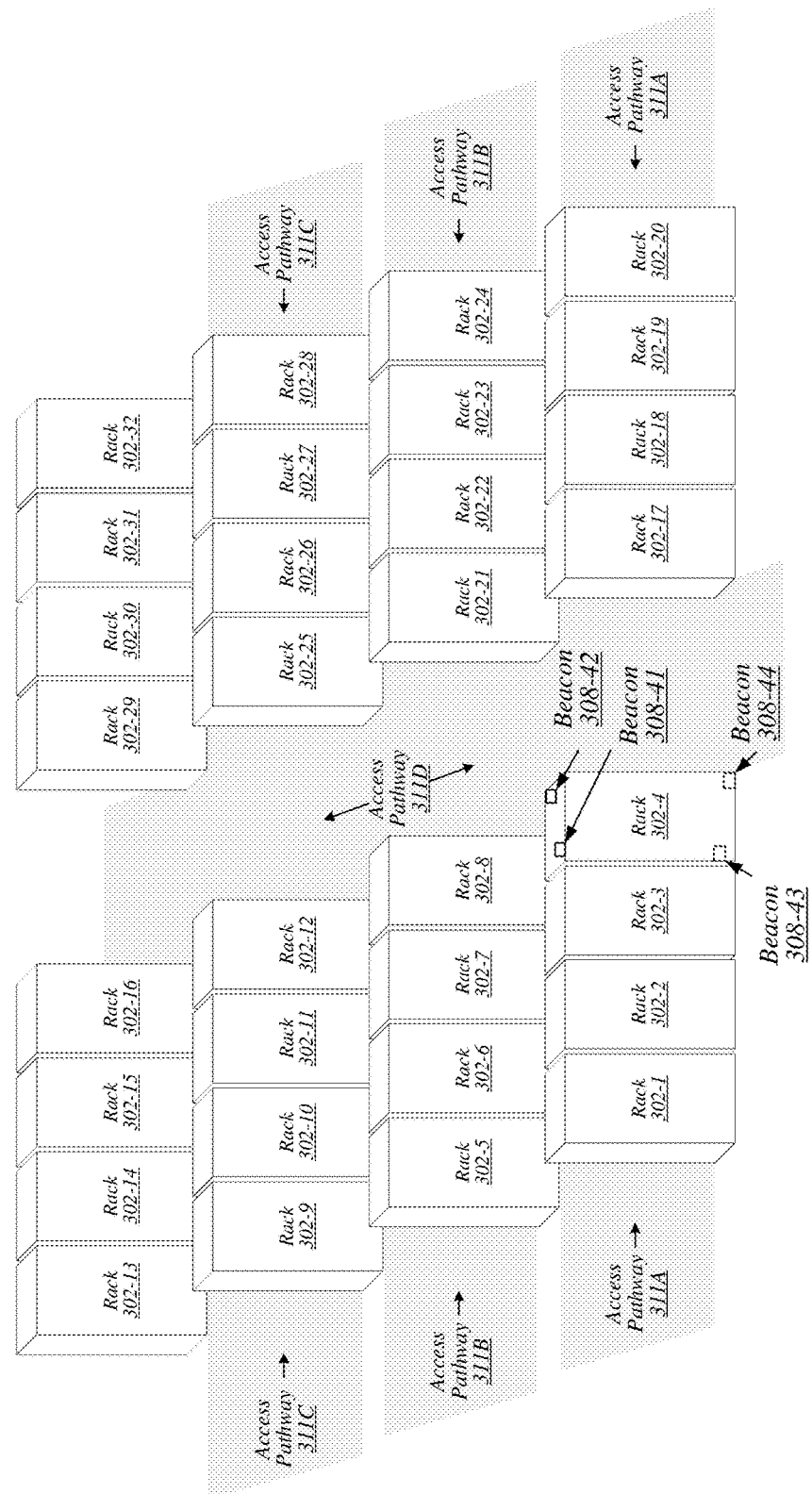
FIG. 3 illustrates a second example data center.

FIG. 3 illustrates an example of a data center 300 that may generally be representative of one in/for which one or more techniques described herein may be implemented according to various embodiments. In the particular non-limiting example depicted in this figure, data center 300 comprises racks 302-1 to 302-32. In various embodiments, the racks of data center 300 may be arranged in such fashion as to define and/or accommodate various access pathways. For example, as shown in this figure, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Additionally, beacons can be placed throughout the data center 300 to provide for physical location determination of individual ones of the physical resources (e.g., refer to FIG. 1 and FIG. 2) that may be disposed within racks 302-1 to 302-32. For example, beacons 308-41 to 308-44 are depicted disposed on rack 302-4. In some examples, beacons (e.g., beacons 308-41 to 308-44, or the like) can be disposed on various locations of a rack. For example, a beacon could be disposed on a lower front portion of a rack (e.g., beacon 308-44 on rack 302-4, or the like) while another beacon could be disposed on a lower rear portion of a rack (e.g., beacon 308-43 on rack 302-4, or the like). Likewise beacon(s) could be disposed on a top portion of a rack (e.g., beacons 308-41 and 308-42, or the like). It is worth noting that less than 4 beacons could be disposed on a rack. In general, however, a quantity of beacons should be implemented to facilitate determining a location of a sled within a rack.

In some examples, beacons 308 can be disposed on each of the racks 302. In other examples, beacons 308 can be disposed on alternating ones of the racks 302, or the like. Furthermore, with some examples, beacons 308 can be disposed at locations on/within/adjacent racks 302 (e.g., on opposing corners of top and bottom, or the like) to reduce interference between signals from beacons 308 and to provide for co-location or triangulation techniques to be implemented to determine locations of physical resources within the data center 300 based on beacon signals. In some examples, beacons 308 may not be associated with pods (e.g., groups of racks, or the like) and/or an entire data center (e.g., data center 300, or the like). As such, techniques described herein could be implemented to determine a location of racks within the data center, and not just sleds within racks. Examples are not limited in this context.

Figure 4:
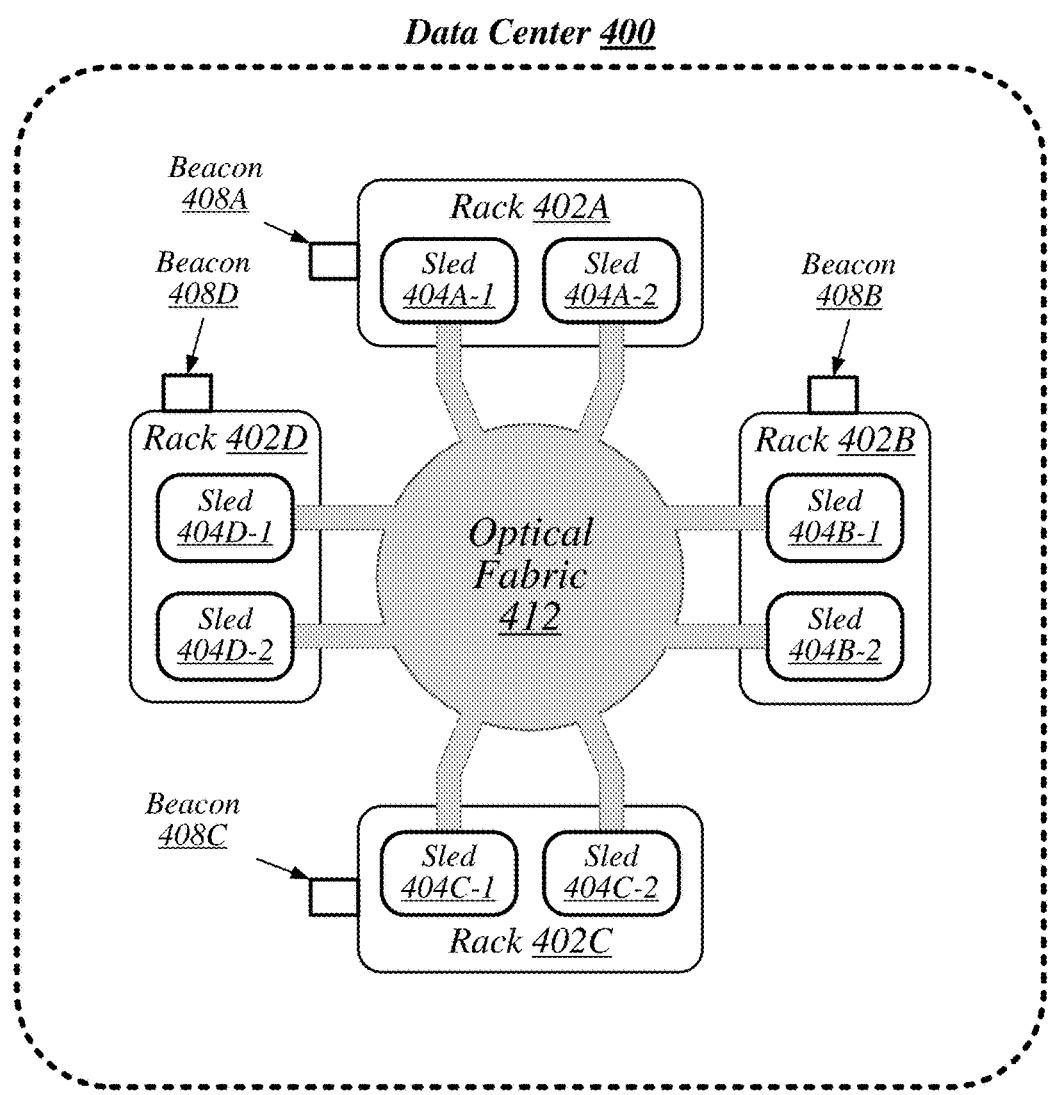
FIG. 4 illustrates a third example data center.

FIG. 4 illustrates an example of a data center 400 that may generally be representative of one in/for which one or more techniques described herein may be implemented according to various embodiments. As shown in this figure, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks.

In the particular non-limiting example depicted here, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400.

Data center 400 can also feature beacons disposed on ones of racks 402A to 402D. For example, as depicted beacons 408A to 408D are disposed on racks 402A to 402D, respectively.

Figure 5:
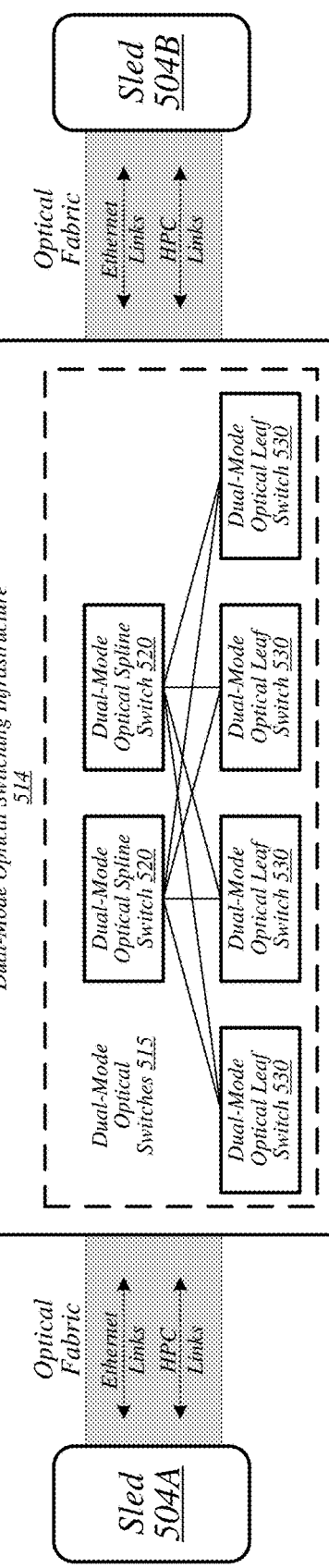
FIG. 5 illustrates a data center connectivity scheme.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In embodiments, the dual-mode switch may be a single physical network wire that may be capable of carrying Ethernet or Onmi-Path communication, which may be auto-detected by the dual-mode optical switch 515 or configured by the Pod management controller. This allows for the same network to be used for Cloud traffic (Ethernet) or High Performance Computing (HPC), typically Onmi-Path or Infiniband. Moreover, and in some instances, an Onmi-Path protocol may carry Onmi-Path communication and Ethernet communication. In some embodiments, dual-mode optical switches 515 may constitute leaf switches 530 in a leaf-spine architecture additionally including one or more dual-mode optical spine switches 520. Note that in some embodiments, the architecture may not be a leaf-spine architecture, but may be a two-ply switch architecture to connect directly to the sleds.

In various embodiments, dual-mode optical switches may be capable of receiving both Ethernet protocol communications carrying Internet Protocol (IP packets) and communications according to a second, high-performance computing (HPC) link-layer protocol (e.g., Omni-Path Architecture, Infiniband, or the like) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
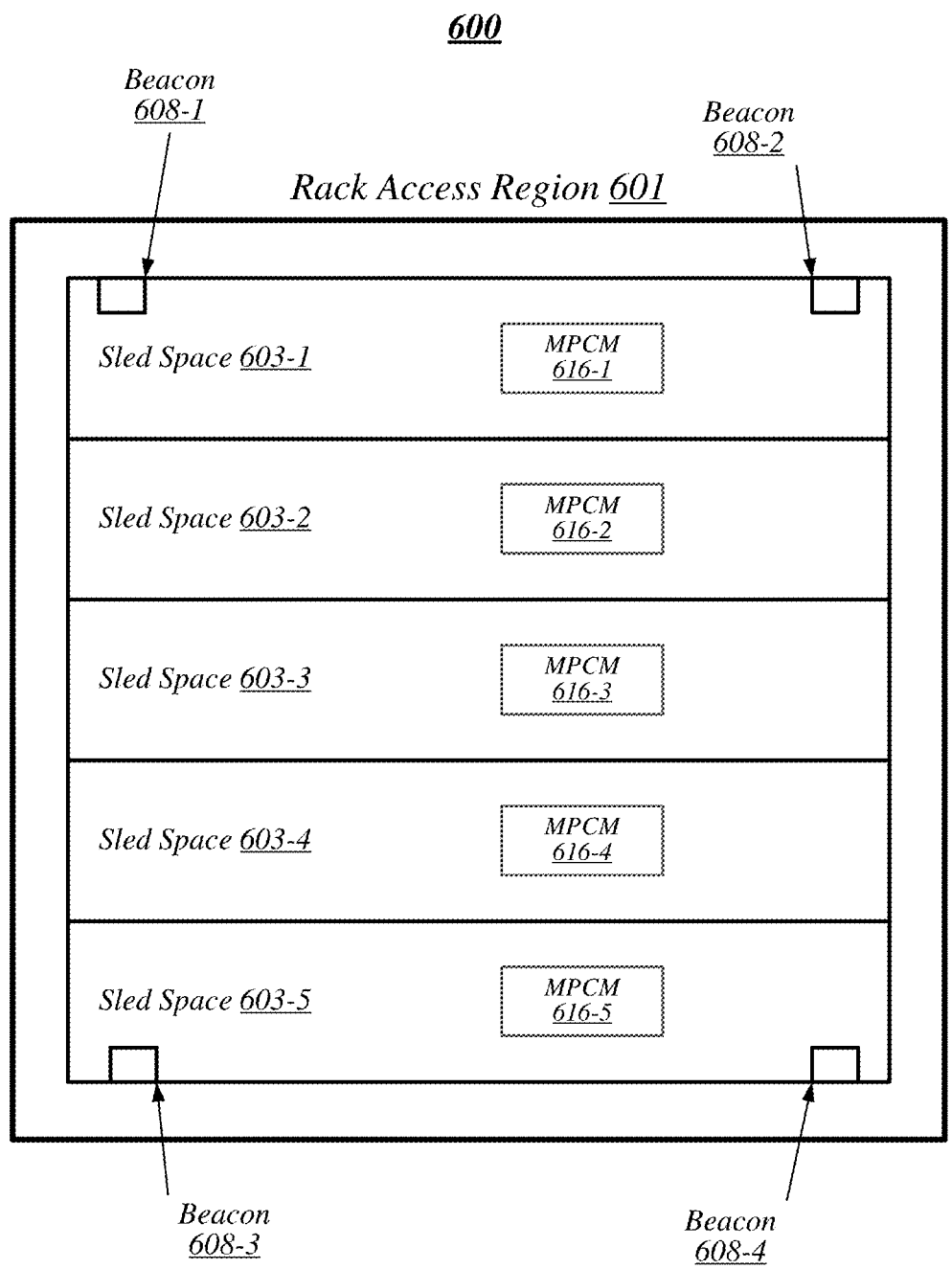
FIG. 6 illustrates a second example rack.

FIG. 6 illustrates a general overview of a rack architecture 600 that may be representative of an architecture of any particular one of the racks depicted herein. As reflected in this figure, rack architecture 600 may generally feature a plurality of sled spaces (or sled bays) into which sleds may be inserted, each of which may be robotically-accessible via a rack access region 601. In this particular non-limiting example, rack architecture 600 features five sled spaces 603-1 to 603-5. Sled spaces 603-1 to 603-5 feature respective multi-purpose connector modules (MPCMs) 616-1 to 616-5. In some instances, when a sled is inserted into any given one of sled spaces 603-1 to 603-5, the corresponding MPCM may couple with a counterpart MPCM of the inserted sled. This coupling may provide the inserted sled with connectivity to both signaling infrastructure and power infrastructure of the rack in which it is housed. When a sled is inserted into any given one of sled spaces 603-1 to 603-5, the corresponding MPCM may couple with a counterpart MPCM of the inserted sled. This coupling may provide the inserted sled with connectivity to both signaling infrastructure and power infrastructure of the rack in which it is housed.

Rack architecture 600 features beacons disposed on portions of an outside perimeter of rack architecture 600. For example, beacons 608-1 to 608-4 are depicted. In some examples, as depicted in this figure, beacons 608-1 to 608-4 can be located within a physical boundary or exterior wall portion of racks architecture 600. For example, beacons 608-1 to 608-4 can be located inside an exterior wall portion of rack architecture 600 to reduce interference between beacons 608-1 to 608-4 and beacon sensors of sleds inserted into sled spaces 603-1 to 603-5 and interference between beacons 608-1 to 608-4 of rack architecture 600 and other rack architectures in a data center. Examples are not limited in this context.

Figure 7:
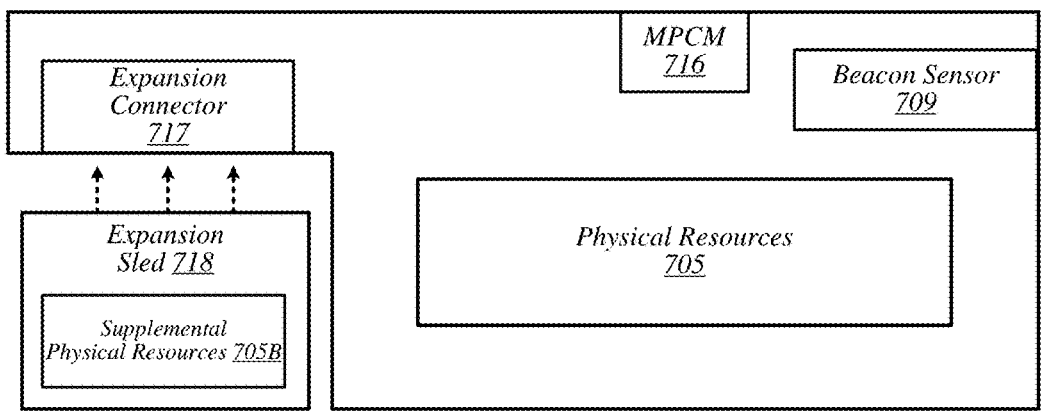
FIG. 7 illustrates a first example sled.

Included among the types of sleds to be accommodated by rack architecture 600 may be one or more types of sleds that feature expansion capabilities. FIG. 7 illustrates an example of a sled 704 that may be representative of a sled of such a type. As shown in this figure, sled 704 may comprise a set of physical resources 705, as well as an MPCM 716 designed to couple with a counterpart MPCM when sled 704 is inserted into a sled space such as any of sled spaces 603-1 to 603-5 of FIG. 6.

Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Sled 704 can also feature a beacon sensor 709. Beacon sensor 709 can be coupled to a management controller (refer to FIG. 11 and FIG. 12). An example management controller is described in greater detail below. However, in general, such a management controller can operate to receive control signals or information elements from beacon sensors (e.g., beacon sensor 709) including an indication of signals received from beacons 608. The management controller can determine a physical location of a resource associated with the beacon sensor 709 based on the information elements, and particularly, the signals from beacons 608. Thus, location of the sled (e.g., in sled space, along access pathways in the data center, or the like) can be determined based on the received beacon signals.

Figure 8:
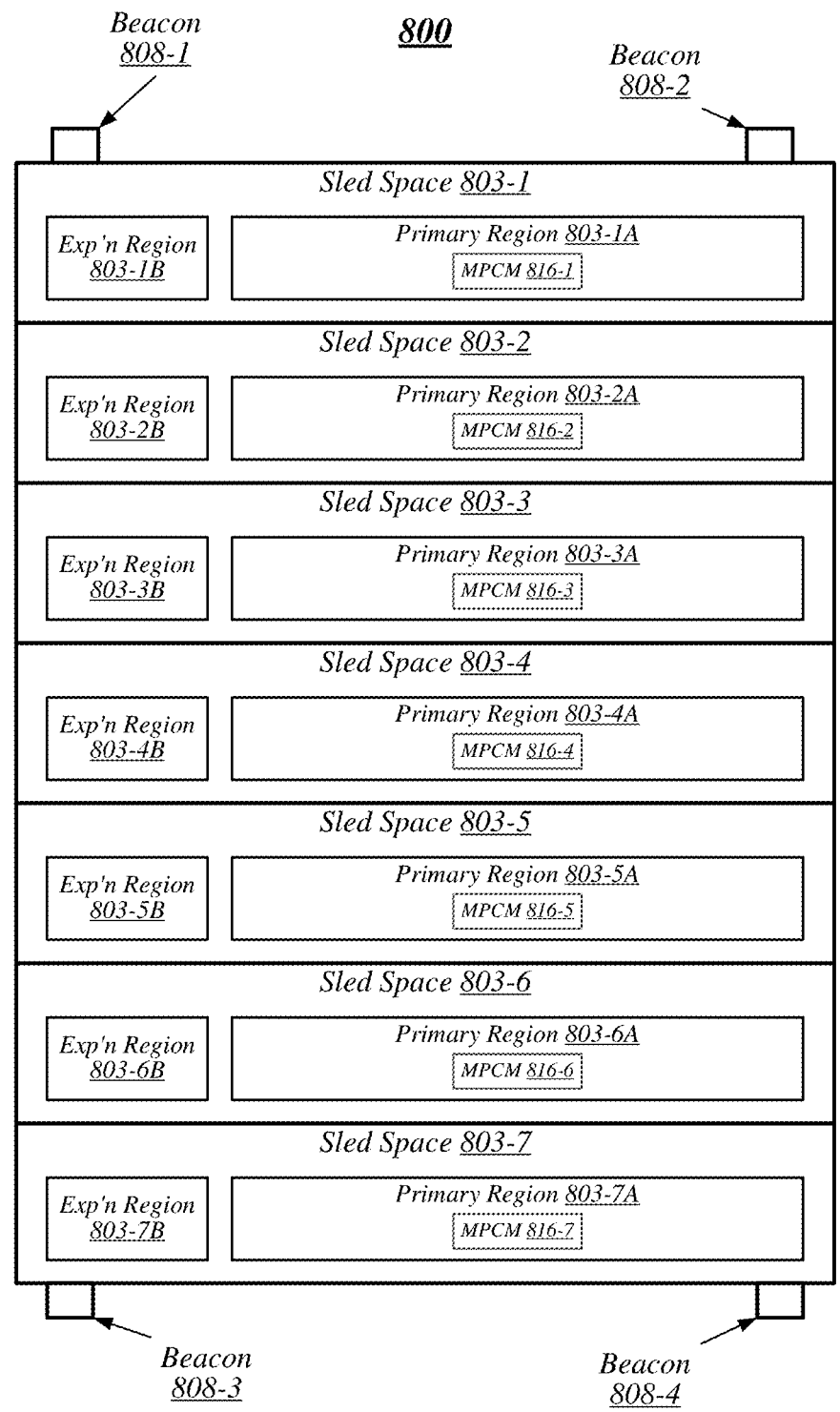
FIG. 8 illustrates a third example rack.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B.

With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Rack architecture 800 features beacons disposed on portions of an outside perimeter of rack architecture 800. For example, beacons 808-1 to 808-4 are depicted. The embodiments are not limited to this example.

Figure 9:
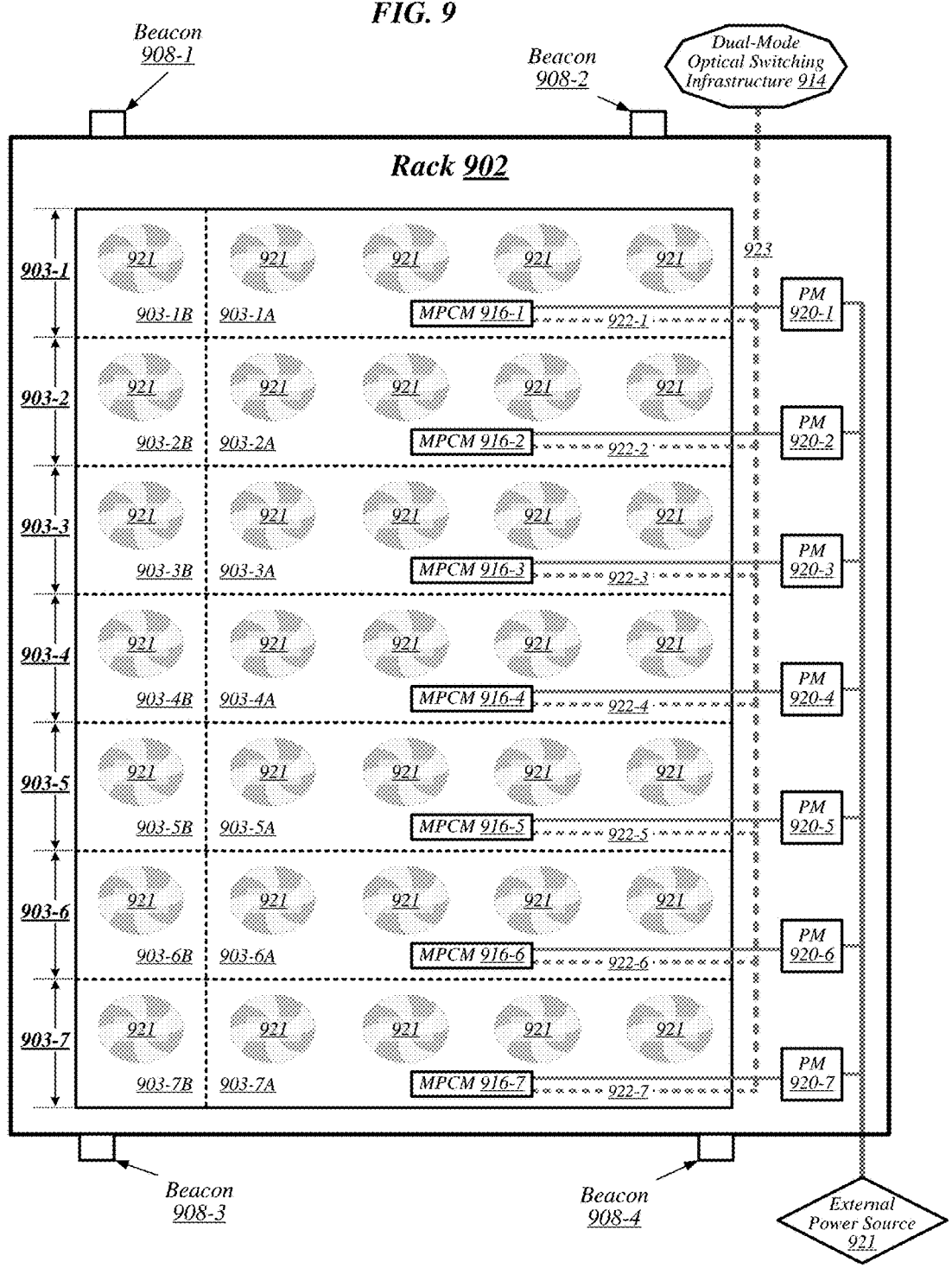
FIG. 9 illustrates a fourth example rack.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. Because inserted sleds connect to an optical switching infrastructure via MPCMs, the resources typically spent in manually configuring the rack cabling to accommodate a newly inserted sled can be saved.

Rack architecture 900 features beacons disposed on portions of an outside perimeter of rack architecture 90000. For example, beacons 908-1 to 908-4 are depicted. The embodiments are not limited in this context.

Figure 10:
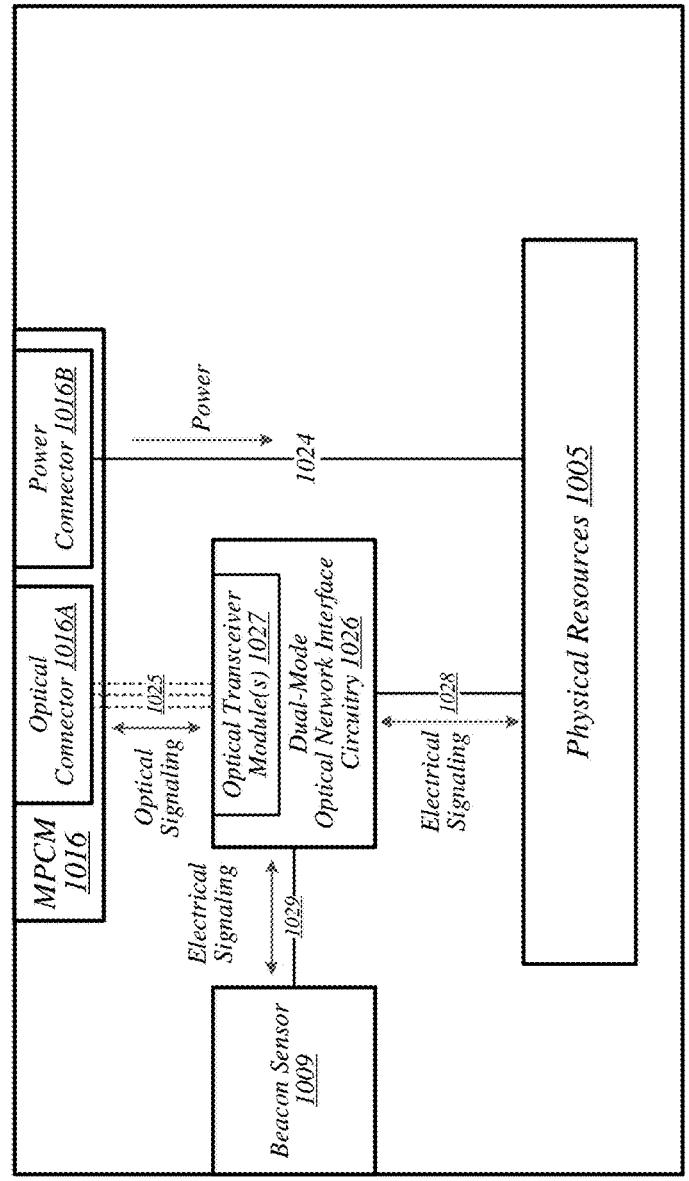
FIG. 10 illustrates a second example sled.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol that offers significantly greater throughput and significantly reduced latency relative to Ethernet. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments.

Sled 1004 can further feature beacon sensor 1009. Beacon sensor 1009 can be coupled (e.g., via dual-mode optical network interface circuitry 1026, via an out-of-band channel, or the like) to a management controller (refer to FIG. 11 and FIG. 12). An example management controller is described in greater detail below. However, in general, such a management controller can operate to receive control signals or information elements from beacon sensors (e.g., beacon sensor 1009) including an indication of signals received from beacons 908. The management controller can determine a physical location of a resource associated with the beacon sensor 1009 based on the information elements, and particularly, the signals from beacons 908. The embodiments are not limited in this context.

FIG. 11 illustrates an example of a data center 1100 that may generally be representative of one in/for which one or more techniques described herein may be implemented according to various embodiments. As reflected in this figure, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag (e.g., ones of the beacons and/or beacon sensors described herein, or the like) associated with each component to be installed.

Infrastructure management framework 1150A can feature pod controller 1134 and sled controller(s) 1132. Pod controller 1134 and sled controller(s) 1132 can provide telemetry and/or signal reporting including indications of signals received from beacons in data center to determine physical location of element of physical infrastructure 1100A within data center 1100. The embodiments are not limited in this context.

As depicted, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as processors, accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is available globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

FIG. 12 illustrates a rack 1202 coupled to various management controllers according to an embodiment. In general, rack 1202 may be representative of an architecture of any particular one of the racks depicted herein. It is noted, that the rack 1202 includes the general rack architecture 600 depicted in FIG. 6. As reflected in this figure, rack 1202 comprises a number of sleds disposed in sled spaces within rack access region 1201. In this particular non-limiting example, rack 1202 features five sled 1204-1 to 1204-5 disposed in sled spaces 1203-1 to 1203-5, respectively. Rack 1202 features beacons disposed on portions rack 1202. For example, beacons 1208-1 to 1208-4 are depicted. Additionally, each of the sleds 1204-1 to 1204-5 include a beacon sensor. Specifically, as depicted, sleds 1204-1 to 1204-5 include beacon sensors 1209-1 to 1209-5, respectively.

In general, beacon sensors can be coupled to management layers and/or frameworks of the data center to which the sleds are a part (e.g., any of the data centers depicted herein, or the like). As depicted, each of beacon sensors 1209-1 to 1209-5 are coupled to a one of sled controllers 1232-1 to 1232-2 while sled controllers 1232-1 to 1232-2 are coupled to pod controller 1234. Pod controller 1234 can be coupled to a data center orchestration layer (not shown). In some embodiments (e.g., as shown) a sled controller can be coupled to more than one sled 1203 and beacon sensor 1209. For example, sled controller 1232-1 is depicted coupled to sleds 1204-1 and 1204-2 while sled controller 1232-2 is depicted coupled to sleds 1204-3 to 1204-5.

In some embodiments, sled controller 1232-1 to 1232-2 can include circuitry arranged to implement pooled system manageability engine (PSME) operations. In some embodiments, pod controller 1234 can comprise circuitry arranged to implement functions on components within a rack, or pod. For example, pod controller 1234 can be arranged to receive telemetry data corresponding to sleds coupled to the pod controller 1234. In particular, pod controller 1234 can receive (e.g., via sled controllers 1232-1 to 1232-2, or the like) information elements including indications of signals exchanged between beacons 1208-1 to 1208-4 and beacon sensors 1209-1 to 1209-5 (e.g., emitted by beacons 1208-1 to 1208-4 and received by beacon sensors 1209-1 to 1209-5, emitted by beacon sensors 1209-1 to 1209-5 and received by beacons 1208-1 to 1208-4, or the like). Such indications of signals can be used to determine a physical location of elements (e.g., physical resources, or the like) associated with the individual beacon sensors.

In some examples, beacon sensors can be implemented in the sled controller (e.g., sled controllers 1232-1, 1232-2, or the like). In such examples, beacon sensors could determine sled locations based on sensor information as detailed herein, in addition to information regarding the sleds controlled by each sled controller, which can be set, for example, at installation of a sled, or the like).

In some examples, beacon sensors may be configured to send information elements including indications of signals received from beacons to POD controllers. In some examples, such information elements can include identifying information from a beacon, such as, for example, a location of a beacon (e.g., rack number in the data center, location of the rack based on access pathways, beacon identification number, or the like). The physical location of the sled could subsequently be determined based on information (e.g., a lookup table, a map, or the like) regarding a physical layout of the data center and referencing the information received from the beacons.

Additionally, sled controllers 1232-1 to 1232-2 can include features to program and/or associated beacon sensors with particular sleds 1202-1 to 1202-5. For example, at provisioning or installation of a sled 1204 within rack 1202, beacon sensors can be associated with (e.g., programmed, burned, flashed, or the like) a particular one of sleds 1204-1 to 1204-5 and physical resources of the sled.

In some examples, the beacon sensors can be configured to "listen" or receive signals on particular frequencies while beacons within the data center can be programmed (e.g., by a POD controller, or the like) to on unique frequencies. In some examples, beacons can be configured to operate on unique frequencies at the time of manufacturing. In alternative examples, beacons can "search" or verify whether a frequency is in use (e.g., at power on, or the like) to find an unused (or used less than a threshold value, or the like) frequency. The beacon can be configured to send a control signal to the POD controller to alert the POD controller to the frequency to which the beacon is configured. The POD controller can subsequently configure the beacon sensors to a matching frequency.

With some implementations, beacon sensors (e.g., beacon sensors 1209-1 to 1209-5) can provide a delay (e.g., in microseconds, or the like) between each selected frequencies for receiving the data. For example, different beacons (e.g., beacons 1208-1 to 1208-4) on a rack can be configured to operate at different frequencies, such as, for example, 1000 MHz, 1100 MHz and 1200 MHz. Each beacon can be configured to transmit signals at a specified time. Assuming each beacon transmits at the same starting time, then beacon sensors will receive the signals at different times (e.g., due to the different frequencies, or the like) and the beacon sensor could be configured to distinguish between these frequencies.

In some examples, beacons (e.g., beacons 1208-1 to 1208-4) may be configured to repeatedly transmit. During periods where a beacon is not transmitting, the beacon may be configured to enter a lower power state, such as, for example, an off state, a sleep state, or the like. In some examples, the beacons can be configured to receive control signals from the POD controller to cause the beacons to enter a lower power state, or exit from a lower power state.

Included herein is a logic flow representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 13:
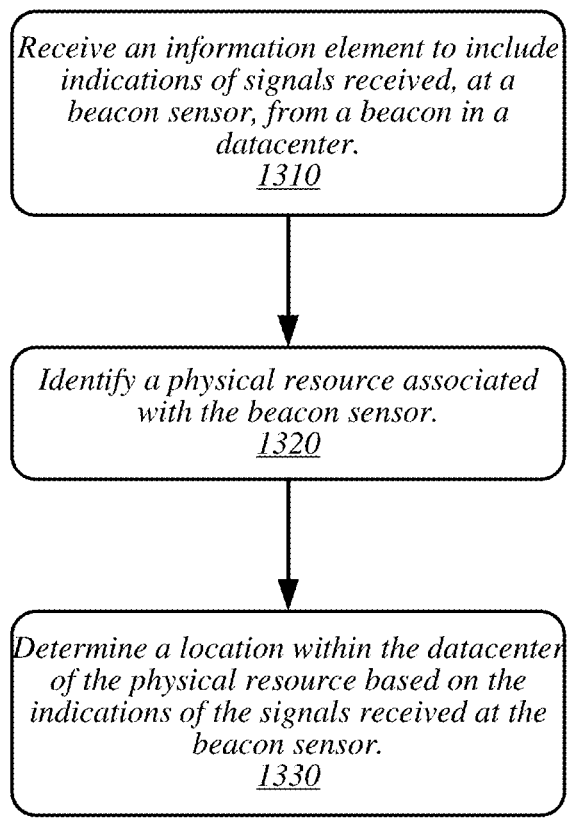
FIG. 13 illustrates an example logic flow.

FIG. 13 illustrates an example of a logic flow. This figure depicts logic flow 1300. Logic flow 1300 may be representative of some or all of the operations executed by one or more logic, features, or devices described herein, such as apparatus 1132 and/or 1134. More particularly, logic flow 1300 may be implemented by at least sled controller(s) 1132 and/or pod controller 1134 to determine a physical location of physical resources within a data center.

Logic flow 1300 can begin at block 1310. At block 1310 "receive an information element to include indications of signals received, at a beacon sensor, from a beacon in a datacenter" sled controller 1132, pod manager 1134 and/or physical infrastructure management framework 1150A can receive an information element including indications of signals received by a beacon sensor from beacons in a data center. For example, beacon sensors 709, 1009, 1209, or the like can send an information element including indications of signals received from beacons in a data center.

Continuing to block 1320 "identify a physical resource associated with the beacon sensor" sled controller 1132, pod manager 1134 and/or physical infrastructure management framework 1150A can determine a physical resource associated with the beacon sensor. As detailed herein, sleds can feature beacon sensors. Beacon sensors can be individually associated with a particular sled (e.g., at provisioning of the sled, at installation of the sled, during a maintenance procedure of the sled or the like).

Continuing to block 1330 "determine a location within the datacenter of the physical resource based on the indications of the signals received at the beacon sensor" sled controller 1132, pod manager 1134 and/or physical infrastructure management framework 1150A can determine a physical location, within the data center of the physical resource associated with the beacon sensor. For example, the sled controller 1132, pod manager 1134 and/or physical infrastructure management framework 1150A can determine a sled space in which the sled is installed, a rack in which the sled is installed, an access pathway to which the rack is disposed, a crossing of access pathways adjacent to the rack in which the sled is installed, or the like.

It is noted, that the location of sleds can be used to, for example, initiate maintenance operations for the sled. In a specific example, control signals can be send (e.g., by framework 1150A, or the like) to cause a robot to go to the determined position and perform a maintenance operation on a sled. Examples are not limited in this context.

Figure 14:
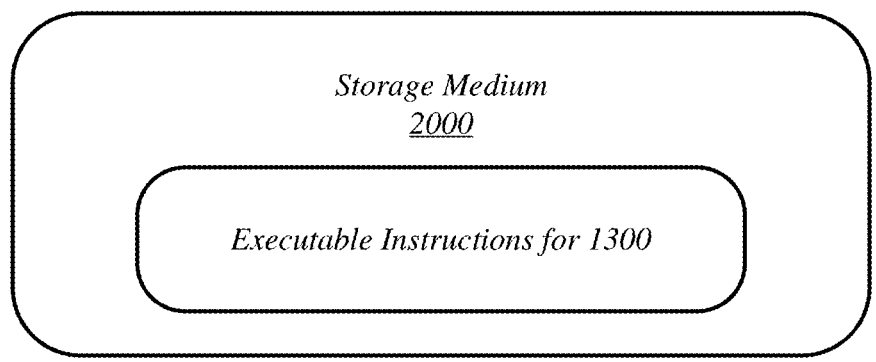
FIG. 14 illustrates an example of a storage medium.

FIG. 14 illustrates an example of a storage medium 2000. Storage medium 2000 may comprise an article of manufacture. In some examples, storage medium 2000 may include any non-transitory computer readable medium or machine readable medium, such as an optical, magnetic or semiconductor storage. Storage medium 2000 may store various types of computer executable instructions, such as instructions to implement logic flow 1300. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 15:
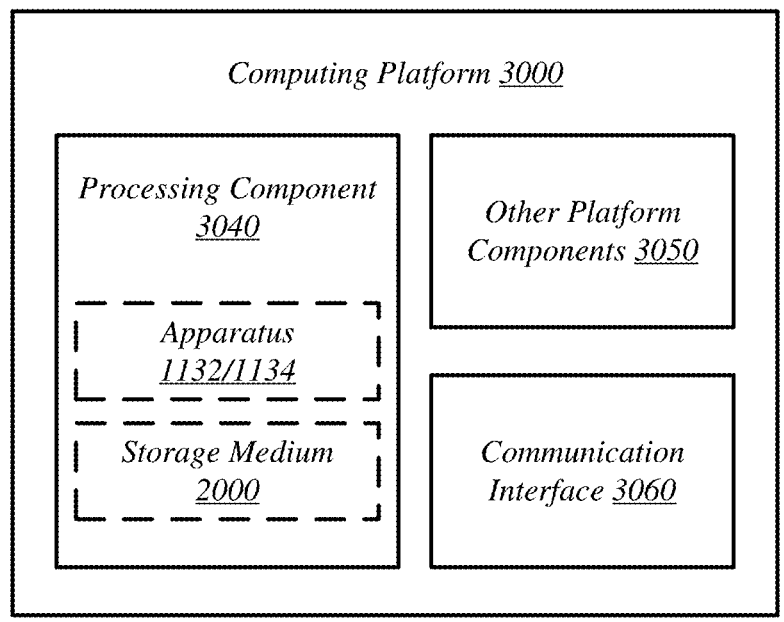
FIG. 15 illustrates an example computing platform.

FIG. 15 illustrates an example computing platform 3000. In some examples, as shown in this figure, computing platform 3000 may include a processing component 3040, other platform components or a communications interface 3060. According to some examples, computing platform 3000 may be implemented in a computing device such as a server in a system such as a data center or server farm that supports a manager or controller for managing configurable computing resources as mentioned above.

According to some examples, processing component 3040 may execute processing operations or logic for apparatus 1132/1134 and/or storage medium 2000. Processing component 3040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 3050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 3060 may include logic and/or features to support a communication interface. For these examples, communications interface 3060 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 3000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 3000 described herein, may be included or omitted in various embodiments of computing platform 3000, as suitably desired.

The components and features of computing platform 3000 may be implemented using any combination of discrete circuitry, ASICs, logic gates and/or single chip architectures. Further, the features of computing platform 3000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 3000 shown in the block diagram of this figure may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The disclosure now turns to providing example implementations.

Example 1

A system comprising: a rack comprising a plurality of sled spaces, each of the plurality of sled spaces arranged to receive a sled having a beacon sensor coupled to the sled; and a beacon coupled to the rack, the beacon to emit a signal to cooperate with the beacon sensor to determine a location of the sled.

Example 2

The system of example 1, comprising a processor and a memory storing instructions executable by the processor, the instructions to cause the processor to receive an information element from the beacon sensor, the information element to include an indication of a location of the sled within the rack.

Example 3

The system of example 1, comprising the sled, the sled comprising at least one physical resource.

Example 4

The system of example 1, comprising a plurality of sleds, each of the plurality of sleds disposed within a respective one of the sled spaces and having a beacon sensor.

Example 5

The system of example 4, each of the plurality of sleds comprising at least one physical resource.

Example 6

The system of example 5, comprising a sled controller, the sled controller communicatively coupled to the beacon sensors, the sled controller to: receive information elements from the beacon sensors, the information elements to include indication of signals exchanged between the beacon and the beacon sensors; and determine a location of a one of the sleds within the sled spaces of the rack.

Example 7

The system of example 6, the information elements to include indication of operating conditions of the physical resources.

Example 8

The system of example 7, the operating conditions comprising at least one of a fault, an error, or a runtime condition.

Example 9

The system of example 6, the sled controller to program the beacon sensors to associate the beacon sensors to a particular one of the sleds.

Example 10

The system of any one of examples 1 to 9, the physical resources comprising at least one of a processor, a memory, a storage, a graphics processing unit, a field-programmable gate array, or an interface.

Example 11

The system of any one of examples 1 to 9, comprising: a plurality of racks, each of the plurality of racks comprising a plurality of sled spaces, each of the plurality of sled spaces arranged to receive a sled having a beacon sensor coupled to the sled; and a plurality of beacons, at least one of the plurality of beacons coupled to a respective one of the plurality of racks, the plurality of beacons to emit a signal to cooperate the beacon sensors.

Example 12

The system example 11, the racks disposed in a data center.

Example 13

The system of any one of examples 1 to 9, the physical resources comprising at least one of a physical compute resource, a physical accelerator resource, a physical storage resource, or a physical memory resource.

Example 14

An apparatus, comprising: a sled to couple to a rack of a data center; and a beacon sensor coupled to the sled, the beacon sensor to receive a signal from a beacon and send an information element to a sled controller, the information element to include an indication of a location of the sled relative to the beacon.

Example 15

The apparatus of example 14, comprising at least one physical resource coupled to the sled.

Example 16

The apparatus of example 15, the information element to include indication of operating conditions of the physical resources.

Example 17

The apparatus of example 16, the operating conditions comprising at least one of a fault, an error, or a runtime condition.

Example 18

The apparatus of example 15, the beacon sensor to receive signals from a plurality of beacons in the data center, the information element to include an indication of a location of the sled relative to the plurality of beacons.

Example 19

The apparatus of any one of examples 15 to 18, the physical resources comprising at least one of a processor, a memory, a storage, a graphics processing unit, a field-programmable gate array, or an interface.

Example 20

The apparatus of any one of examples 15 to 18, the physical resource comprising at least one of a physical compute resource, a physical accelerator resource, a physical storage resource, or a physical memory resource.

Example 21

A method comprising: receiving an information element to include indications of signals received, at a beacon sensor, from a beacon in a datacenter; identifying a first physical resource of the data center associated with the beacon sensor; and determining a location within the datacenter of the first physical resource based on the indications of the signals received at the beacon sensor.

Example 20

The method of example 19, the data center comprising a plurality of racks, each of the plurality of racks comprising a plurality of sled spaces arranged to receive a sled, each of the sleds comprising at least one of a plurality of physical resources, the first physical resource a one of the plurality of physical resources.

Example 21

The method of example 20, the information element to include an indication of a one of the plurality of racks and sled spaces in which the first physical resource is disposed.

Example 22

The method of example 21, comprising receiving the information element at a pod controller of the data center.

Example 23

The method of example 22, each of the sleds comprising a beacon sensor.

Example 24

The method of example 22, the information elements to include indication of operating conditions of the first physical resource.

Example 25

The method of example 24, the operating conditions comprising at least one of a fault, an error, or a runtime condition.

Example 26

The method of example 22, the pod controller to program the beacon sensors to associate the beacon sensors to first physical resource.

Example 27

The method of any one of examples 21 to 26, the first physical resources comprising at least one of a processor, a memory, a storage, a graphics processing unit, a field-programmable gate array, or an interface.

Example 28

The method of any one of examples 21 to 26, the physical resources comprising at least one of a physical compute resource, a physical accelerator resource, a physical storage resource, or a physical memory resource.

Example 29

At least one machine readable medium comprising a plurality of instructions that in response to being executed by a pod controller in a data center cause the pod controller to: receive an information element to include indications of signals received, at a beacon sensor, from a beacon in a datacenter; identify a first physical resource of the data center associated with the beacon sensor; and determine a location within the datacenter of the first physical resource based on the indications of the signals received at the beacon sensor.

Example 30

The at least one machine readable medium of example 29, the data center comprising a plurality of racks, each of the plurality of racks comprising a plurality of sled spaces arranged to receive a sled, each of the sleds comprising at least one of a plurality of physical resources, the first physical resource a one of the plurality of physical resources.

Example 31

The at least one machine readable medium of example 30, the information element to include an indication of a one of the plurality of racks and sled spaces in which the first physical resource is disposed.

Example 32

The at least one machine readable medium of example 31, each of the sleds comprising a beacon sensor.

Example 33

The at least one machine readable medium of example 31, the information elements to include indication of operating conditions of the first physical resource.

Example 34

The at least one machine readable medium of example 33, the operating conditions comprising at least one of a fault, an error, or a runtime condition.

Example 35

The at least one machine readable medium of example 31, comprising instructions that cause the pod controller to program the beacon sensor to associate the beacon sensors to first physical resource.

Example 36

The at least one machine readable medium of examples 29 to 35, the first physical resources comprising at least one of a processor, a memory, a storage, a graphics processing unit, a field-programmable gate array, or an interface.

Example 37

The at least one machine readable medium of examples 29 to 35, the physical resources comprising at least one of a physical compute resource, a physical accelerator resource, a physical storage resource, or a physical memory resource.

Example 38

The at least one machine readable medium of any one of examples 29 to 37, wherein the machine readable medium is non-transitory.

Example 39

An apparatus comprising: means to receive an information element to include indications of signals received, at a beacon sensor, from a beacon in a datacenter; means to identify a first physical resource of the data center associated with the beacon sensor; and means to determine a location within the datacenter of the first physical resource based on the indications of the signals received at the beacon sensor.

Example 40

The apparatus of example 39, the data center comprising a plurality of racks, each of the plurality of racks comprising a plurality of sled spaces arranged to receive a sled, each of the sleds comprising at least one of a plurality of physical resources, the first physical resource a one of the plurality of physical resources.

Example 41

The at least one machine readable medium of example 30, the information element to include an indication of a one of the plurality of racks and sled spaces in which the first physical resource is disposed.

Example 32

The at least one machine readable medium of example 31, each of the sleds comprising a beacon sensor.

Example 33

The at least one machine readable medium of example 31, the information elements to include indication of operating conditions of the first physical resource.

Example 34

The at least one machine readable medium of example 33, the operating conditions comprising at least one of a fault, an error, or a runtime condition.

Example 35

The at least one machine readable medium of example 31, comprising instructions that cause the pod controller to program the beacon sensor to associate the beacon sensors to first physical resource.

Example 36

The at least one machine readable medium of examples 29 to 35, the first physical resources comprising at least one of a processor, a memory, a storage, a graphics processing unit, a field-programmable gate array, or an interface.

Example 37

The at least one machine readable medium of examples 29 to 35, the physical resources comprising at least one of a physical compute resource, a physical accelerator resource, a physical storage resource, or a physical memory resource.

Example 38

The at least one machine readable medium of any one of examples 29 to 37, wherein the machine readable medium is non-transitory.

The invention claimed is:

1. A system comprising:
a rack comprising a plurality of sled spaces, each of the plurality of sled spaces arranged to receive a sled having a beacon sensor coupled to the sled;
a plurality of sleds, each of the plurality of sleds disposed within a respective one of the sled spaces and having a beacon sensor, each of the plurality of sleds comprising at least one physical resource;
a sled controller, the sled controller communicatively coupled to the beacon sensors of the plurality of sleds, the sled controller to:
receive information elements from the beacon sensors of the plurality of sleds, the information elements from the beacon sensors of the plurality of sleds to include indication of signals exchanged between the beacon and the beacon sensors; and
determine a location of a one of the sleds within the sled spaces of the rack; and
one or more beacons coupled to the rack, the one or more beacons to emit a signal to be received by one of the beacon sensors of the plurality of sleds to be used to determine a location of the corresponding sled within the rack, wherein the one or more beacons are further to send, to a remote management entity, an information element including an indication of the location of the sled within the rack and an indication of an operating condition of the at least one physical resource.

2. The system of claim 1, comprising a processor and a memory storing instructions executable by the processor, the instructions to cause the processor to receive the information element from the one of the beacon sensors of the plurality of sleds.

3. The system of claim 1, the operating conditions comprising at least one of a fault, an error, or a runtime condition.

4. The system of claim 1, the sled controller to program the beacon sensors of the plurality of sleds to associate the beacon sensors of the plurality of sleds to a particular one of the sleds.

5. The system of claim 2, wherein the instructions cause the processor to determine the location of the sled within the rack through triangulation of the signals emitted from the one or more beacons.

6. The system of claim 2, wherein the instructions further cause the processor to:
access, based on the information element, a lookup table; and
determine, based on the lookup table, the location of the sled within the rack.

7. The system of claim 1, wherein each of the one or more beacons is configured to operate at a different frequency.

8. The system of claim 7, wherein each of the one or more beacons is configured to, upon start-up, search for a frequency whose usage is below a threshold and operate at the frequency whose usage is below a threshold.

9. The system of claim 1, comprising the one or more beacons and the sleds having the beacon sensors, wherein the beacon and the beacon sensors communicate using near field communication (NFC).

10. The system of claim 1, wherein the one or more beacons are magnetic beacons.

11. The system of claim 1, wherein the one or more beacons are configured to enter a low power state when not transmitting.

12. An apparatus, comprising:
a plurality of sleds coupled to a rack of a data center, the rack having a plurality of sled spaces, each of the plurality of sleds disposed within a respective one of the plurality of sled spaces, each of the plurality of sleds comprising at least one physical resource;
a sled controller; and
a plurality of beacon sensors coupled to the plurality of sleds, each of the plurality of beacon sensors to:
receive signals from one or more beacons coupled to the rack;
send an information element to the sled controller, the information element to include signals exchanged between the one or more beacons and the plurality of beacon sensors and an indication of a location of one of the plurality of sleds relative to one of the plurality of beacons and an indication of an operating condition of the at least one physical resource; and
send the information element to a remote management entity,
wherein the sled controller is to determine a location of the one of the plurality of sleds within the plurality of sled spaces of the rack.

13. The apparatus of claim 12, the operating conditions comprising at least one of a fault, an error, or a runtime condition.

14. A method comprising:
receiving an information element to include indications of signals received, at a plurality of beacon sensors, from one or more beacons coupled to a rack in a data center, the information element to include an indication of an operating condition of a first physical resource of one or more sleds in the rack of the data center;

identifying the first physical resource in the rack of the data center associated with at least one of the plurality of beacon sensors;

determining a location within the rack of the data center of the first physical resource based on the indications of the signals received at the one of the plurality of beacon sensors; and sending, by the one or more beacons to a remote management entity, an indication of signals exchanged between the one or more beacons and the plurality of beacon sensors, an indication of the location of the first physical resource, and the indication of the operating condition of the first physical resource.

15. The method of claim 14, the data center comprising a plurality of racks, each of the plurality of racks comprising a plurality of sled spaces arranged to receive a sled, each of the sleds comprising at least one of a plurality of physical resources, the first physical resource being one of the plurality of physical resources.

16. The method of claim 15, the information element to include an indication of a one of the plurality of racks and sled spaces in which the first physical resource is disposed.

17. The method of claim 16, comprising receiving the information element at a pod controller of the data center.

18. At least one non-transitory machine readable medium comprising a plurality of instructions that in response to being executed by a pod controller in a data center cause the pod controller to:

receive an information element to include indications of signals received, at a plurality of beacon sensors, from one or more beacons in a data center, the information element to include an indication of a one of a plurality of racks in which a first physical resource is disposed and an operating condition of the first physical resource;

identify the first physical resource of the data center associated with the beacon sensor;

determine a location within the data center of the first physical resource based on the indications of the signals received at one of the plurality of beacon sensors;

program the one of the plurality of beacon sensors to associate the one of the plurality of beacon sensors to the first physical resource and the one of the plurality of racks; and send, to a remote management entity, an indication of the location of the first physical resource and an operating condition of the first physical resource.

19. The at least one machine readable medium of claim 18, the data center comprising the plurality of racks, each of the plurality of racks comprising a plurality of sled spaces arranged to receive a sled, each of the sleds comprising at least one of a plurality of physical resources, the first physical resource being one of the plurality of physical resources.

* * * * *